Sept. 28, 1943.　　　　　　　R. B. HULL　　　　　2,330,429
VOLTAGE CONTROL APPARATUS
Filed Feb. 13, 1942　　　2 Sheets-Sheet 1

INVENTOR
Raouel B. Hull
BY
Spencer, Hardman & Fehr
ATTORNEY

Sept. 28, 1943.  R. B. HULL  2,330,429
VOLTAGE CONTROL APPARATUS
Filed Feb. 13, 1942  2 Sheets-Sheet 2
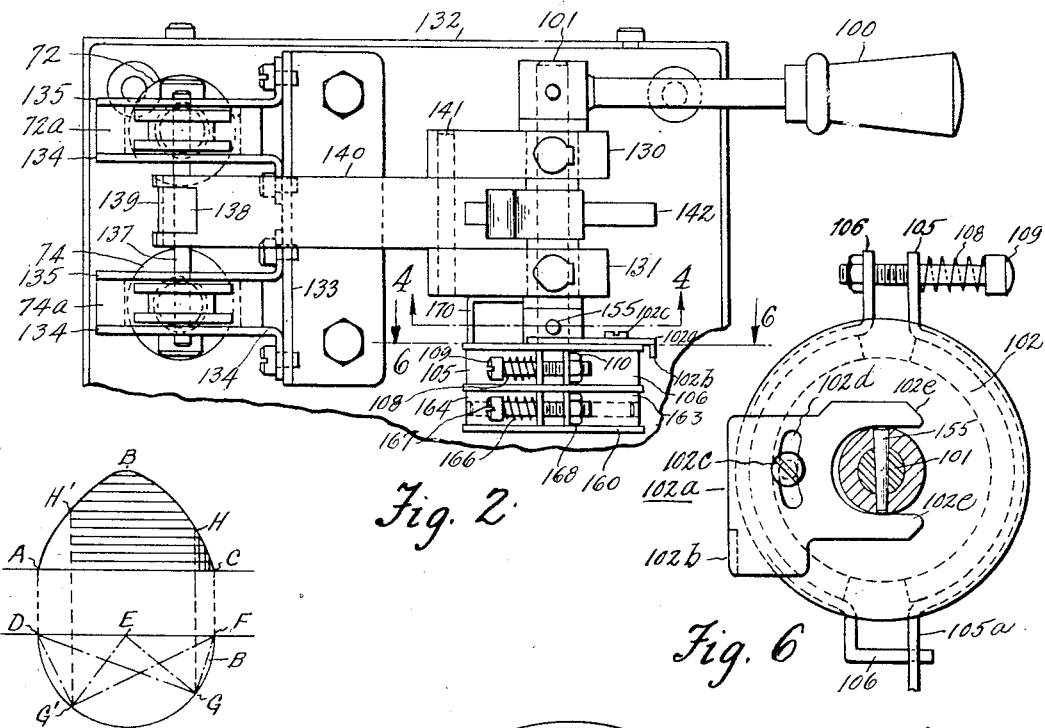
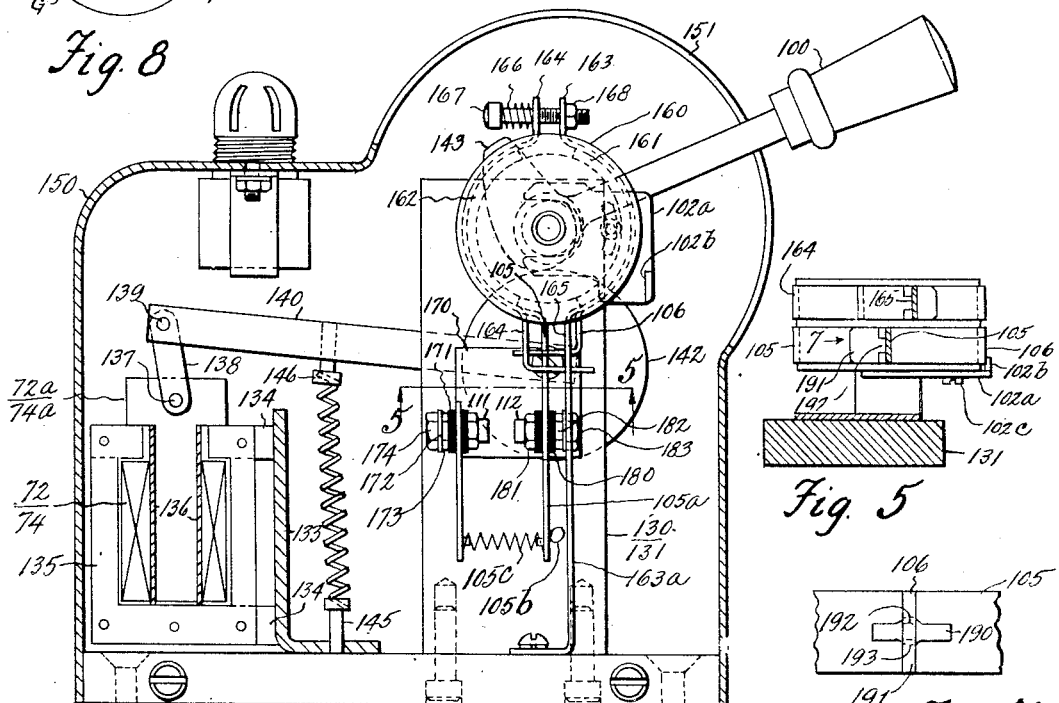
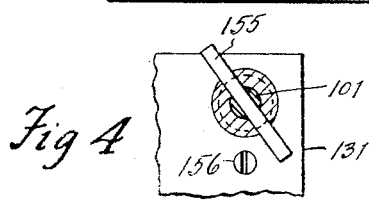
INVENTOR
Raouel B. Hull
BY
Spencer Hardman & Fehr
his ATTORNEYS Patented Sept. 28, 1943

2,330,429

UNITED STATES PATENT OFFICE 2,330,429

VOLTAGE CONTROL APPARATUS

Raouel B. Hull, Anderson, Ind., assignor to General Motors Corporation, Detroit, Mich., a corporation of Delaware Application February 13, 1942, Serial No. 430,769

2 Claims. (Cl. 172—179)

This invention relates to apparatus for testing the performance of power-shaft-driven devices, at various speeds. The device to be tested is driven by a variable speed electric motor which is quickly brought to rest after the test by resistance loading its armature thus providing a dynamic brake. It is an object of the invention to provide a system of control of the speed of the electric motor which permits the use of a manually operated control apparatus known hereinafter as a control monitor and having provisions for varying speed without the use of electrical contactors in response to movement of a control handle, and having means for causing dynamic braking to become operative in response to the movement of the control handle to zero speed position.

To control the speed of the electric motor I make use of a feature of the system of my copending application No. 382,789 filed March 11, 1941, which discloses a system for providing a variable D. C. voltage without the use of a rheostat having electrical contactors. In this system the controlled D. C. voltage is obtained by rectification of an A. C. voltage through the use of rectifier tubes of the thyratron type. By means of adjustable reactors an infinitely variable control of the phase relation between the grid voltage and the cathode voltage of the tubes is obtained, over a wide range. By varying this phase relation, the point in the A. C. wave in the anode circuit at which the tubes fire can be varied. Consequently the D. C. output voltage obtained by rectification of alternating current can be varied over a wide range, the increment of variation being as small or as large as desired.

In the present invention, the control monitor handle actuates the cores of the adjustable reactors to control the motor speed and also effects the application of rectified A. C. voltage to the armature the electric motor when the handle is moved away from zero speed position and the opening of a normally closed resistor load circuit of the motor armature. Conversely, when the handle is returned to zero speed position, the application of rectified A. C. voltage to the armature ceases and the armature resistance loading is reestablished to brake rotation of the armature.

Further objects and advantages of the present invention will be apparent from the following description, reference being had to the accompanying drawings wherein a preferred embodiment of the present invention is clearly shown.

In the drawings:

Fig. 2 is a plan view (with the cover removed) of a manually operated control monitor for varying the angle of phase shift between the grid voltage and the cathode voltage of the rectifier tubes.

Fig. 3 is a side view thereof with cover and one of the reactors in section.

Fig. 4 is a sectional view on line 4—4 of Fig. 2.

Fig. 5 is a sectional view taken on lines 5—5 of Fig. 3.

Fig. 6 is a sectional view (enlarged) taken on line 6—6 of Fig. 2.

Fig. 7 is a fragmentary view showing the manner of hinging certain parts of the brake of the control monitor.

Fig. 8 is a diagram showing the manner in which the control monitor varies the phase angle between the grid voltage and cathode voltage.

Figure 1:
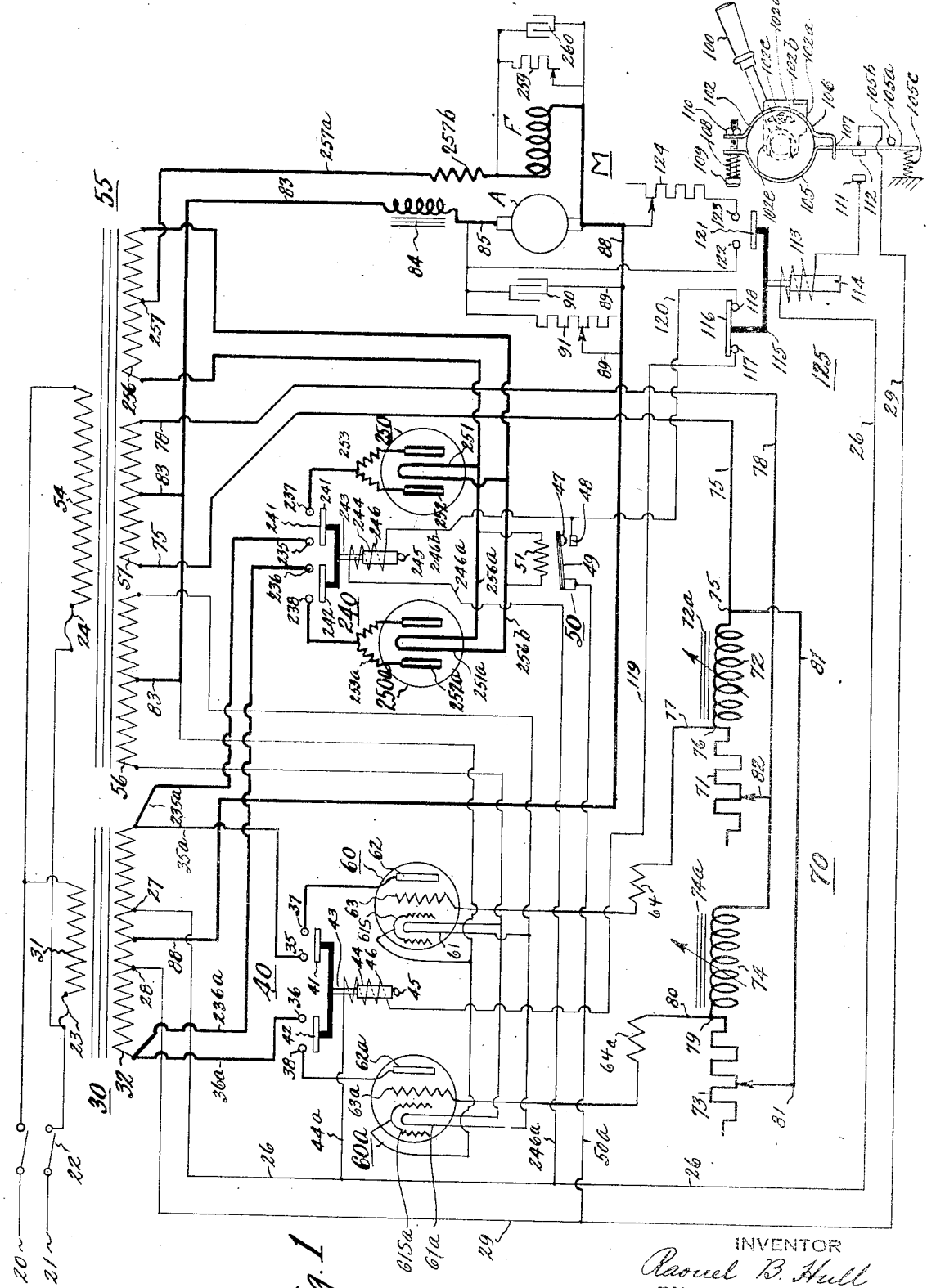
Fig. 1 is a wiring diagram of an embodiment of the present invention.

Referring to Fig. 1 line wires 20 and 21 from an A. C. source at 220 volts and 60 cycles are connected by switch 22 and fuses 23 and 24 with primaries 31 and 54 of transformers 30 and 55, respectively. Transformer 30 is the main power transformer for supplying anode current to two grid controlled rectifier tubes 60 and 60a for fullwave rectification. The ends of transformer secondary 32 are connected by wires 35a, 36a with contacts 35 and 36, respectively, of a relay 40 having movable contacts 41 and 42 for connecting contacts 35 and 36 respectively with other stationary contacts 37 and 38 connected, respectively, with anodes 62 and 62a of tubes 60 and 60a. Movable contacts 41 and 42 are insulated from each other and are connected by a rod 43 with an armature 44 normally down against a stop 45 and attracted upwardly by a coil 46 connected by wire 26 and 44a with the tap 27 of transformer secondary 32. Tap 28 of secondary 32 is connected by wires 29 and 50a with a thermal switch 50 having a bimetal blade 49 carrying a contact 47 for engaging a contact 48 connected with wire 120, and having a heater coil 51 connected with secondary 256 of a transformer 55 by wires 256a and 256b. The thermal switch 50 is so constructed that, when the instrument is at room temperature, the normally separated contacts 47 and 48 will engage in about one minute after the switch 22 is closed. As will be apparent later the purpose of this is to permit the rectifier tubes 60 and 60a to be heated before becoming connected with secondary 32 of transformer 30. Tubes 60 and 60a are preferably type FG-17 thyratron tubes.

The closing of switch 22, connects wires 20 and 21 with primary coil 54 of auxiliary transformer 55 having secondary coils 56, 57 and 256. The function of secondary 56 is to supply the necessary power to the cathodes or heaters 61 and 61a of the rectifier tubes 60 and 60a having grids 63 and 63a connected respectively with fixed resistances 64 and 64a, the purpose of which is to limit the grid current.

The function of secondary 57 of transformer 55 is to supply power to the phase shifting circuits (indicated by lines of medium width in Fig. 1) comprising the apparatus 70 hereinafter called the "control monitor." Its function is to vary the phase relation of the grid voltage with respect to cathode voltage within certain limits. Since the phase-shifting method of grid control is used, an excess of voltage may be applied to the monitor 70. Monitor 70 comprises two variable inductive reactors 72 and 74 of the movable core type which cooperate with two adjustable resistances 71 and 73 connected in bridge to the secondary 57 of the phase shifting voltage transformer 55. Resistances 71 and 73 may be mounted on a panel which supports the tubes and transformers. These resistances are adjusted to balance the tubes 60 and 60a. By means of resistors 71 and 73 the limits of the angle of phase shift of grid voltage with respect to cathode voltage are set, thus determining the range within which lies the point in the A. C. wave in the anode circuit at which the tube fires; and at the same time balancing the anode current through the tubes. Wire 75 connects an end of transformer secondary 57 with reactor coil 72 having a connection at 76 with resistor 71 and with a wire 77 leading to resistance 64 and grid 63. Wire 78 connects an end of transformer secondary 57 with reactor coil 74 having a connection at 79 with resistor 73 and connected by wire 80 with resistance 64a and grid 63a. Wire 81 connects wire 75 with resistor 73. Wire 82 connects wire 78 with resistor 71.

One side of the rectified D. C. line includes wire 83 (heavy line) connected with the center taps of the transformer secondaries 56 and 57, a swinging choke 84, wire 85 and armature A of motor M whose speed is to be controlled. The other side of the rectified D. C. line includes wire 86 connected with armature A and with the center tap of secondary 32 of transformer 30. Wire 89 connects wire 88 with a filter condenser 90 connected across the D. C. output wires 85 and 88. Condenser 90 reduces the ripple and raises the output voltage. Variable bleeder-resistor 91, connected in parallel with condenser 90 to bleed the same, operates to absorb any high inverse voltage surges from any highly inductive power device such as motor M which is connected with wires 85 and 88. The function of the swinging choke 84 is to protect the rectifier tubes 60 and 60a since the peak charging current of the condenser 90 will reach a value in excess of the rated capacity of these tubes.

By change the inductive reactance in the bridge circuits which is accomplished by moving the cores 72a and 74a in or out of the reactor coils 72 and 74, a variation of the phase relation of the grid voltage with respect to cathode voltage is obtained over a wide range thus providing an accurate control over the output of the rectifier tubes from zero load to full load depending on the limits set by the resistances 71 and 73. In the diagram Fig. 8, distance horizontally on the line A—C represents time and the distances vertically represent voltage. The curve ABC represents one-half of a full wave of alternating current, the distance AC being 180° or the time of one-half cycle of alternating current. The distance from the curve ABC to the base line AC represents instantaneous A. C. voltage applied to the tubes. The line DEF represents, vectorially, an angle of 180°, EG or EG' represents grid voltage and two conditions of phase shift which may exist. When the reactor cores 72a and 74a are located so as to occupy all of the central portion within the reactor coils 72 and 74, the grid voltage line G will coincide with line EF denoting that grid voltage is at 180° phase displacement with respect to the alternating current voltage represented by ABC. At C, this voltage is zero; therefore no output current will be passed by the tubes 60 and 60a. When the reactor cores 74 and 74a are pulled part-way out, the grid voltage changes phase from DEF or 180° to angle DEG. GF represents voltage drop across the reactors 72 and 74; and GD represents voltage drop across the resistors 71 and 73. In every instance the vectors EG and EG' represent the value of the voltages impressed on the grids. This means that the tubes 60 and 60a will begin to pass current at point H on alternating current voltage wave ABC. The shaded portion under the line HC represents the output from the tubes 60 and 60a. When the reactor cores 72a and 74a have been nearly withdrawn from the reactor coils 72 and 74 the phase relation between grid voltage and cathode voltage changes to the angle DEG'. G'F is the reactor voltage drop and G'D is the resistor voltage drop. This means that the tubes 60 and 60a begin to pass current at point H' on the alternating current voltage curve ABC. The shaded portion beneath the line H'BC represents the output of the tubes. It is therefore apparent that the withdrawal of the cores from the reactors changes conditions from one wherein the tubes do not pass current at any time during the alternating current wave to a condition wherein the tubes pass current at all times during the wave. Consequently, the rectified output voltage is increased from zero to the maximum during the withdrawal of the reactor cores and is reduced as the cores are moved back into the reactor coils.

On the right hand side of Fig. 1 is shown a lever 100 for turning a shaft 101 carrying a brake drum 102 engaged by brake lining members 103 and 104 (Fig. 6) attached, respectively, to brake bands 105 and 106 which are hingedly connected at 107 and are urged toward the drum by a spring 108 surrounding a screw 109 passing through the bands 106 and 106 and engaging a nut 110. The extension 105a of the band 105 carries a contact 112 for engaging a contact 111 connected with magnet coil 113 of a relay 125. When the handle 100 is rotated clockwise, the contact 112 will engage the contact 111 in order to connect a magnet coil 113 with wires 26 and 29. The coil 113 will be energized and will attract upwardly a solenoid armature 114 insulatingly connected by a frame 115 with contacts 116 and 121. When contacts 111 and 112 are separated and 113 is deenergized contact 116 engages contacts 117 and 118 and contact 121 is separated from contacts 122 and 123.

The mechanical connections (not shown in Fig. 1) between the handle 100 and the reactor cores 72a and 74a will be explained in detail later in connection with the description of Figs. 2 to 6. For the present, it is sufficient to state that when the handle 100 is moved counterclockwise, the cores 72a and 74a are being withdrawn from the coils 72 and 74; and, conversely when the handle 100 is moved clockwise, the cores are being moved into the coils. Therefore, when the handle 100 is moved counterclockwise, the output voltage increases; and, when the handle is moved clockwise, the output voltage decreases. While the handle 100 is being moved counterclockwise the switch contacts 111 and 112 are separated due to the face that band extension 105 moves against a stop 105b due to the frictional drag of drum 102 and due to the action of spring 105c.

Therefore, magnet coil 113 is disconnected from transformer secondary 32 and contact 116 engages contacts 117 and 118 of relay 125. As soon as thermal switch 50 closes coil 44 of relay 40 will be connected with secondary 32 and the armature 44 will move upwardly to connect contacts 41 and 42 with contacts 35—37 and 36—38 and thus to render tubes 60 and 60A effective to cause a rectified D. C. voltage to be applied to motor armature A and indicated by the heavy lines in Fig. 1. At the same time a rectified D. C. voltage, which remains substantially constant is applied to motor field F as indicated by the medium heavy dash lines in Fig. 1. When switch 50 closes while contact 116 engages contacts 117 and 118, the magnet coil 245 of relay 240 is connected with the taps 27 and 28 of secondary 32 by wire 245a connected with wire 26 and by wire 246 be connected with wire 128. Armature 244 of relay 240 rises to cause contacts 241 and 242 (insulatingly supported by the armature) to engage contacts 235—237 and 236—238 thereby connecting secondary 32 with rectifier tubes 250 and 250a through wires 235a and 236a and circuits respectively including resistances 253 and anodes 252 and resistances 253a and anodes 252a. Cathodes 251 and 251a are connected by wires 256a and 256b with secondary 256 of transformer 55. Secondary center tap 257 is connected by wire 257a with motor field F. Resistance 259, connected across field F and paralleling a ripple-smoothing condenser 260, is a bleeder resistance which improves the smoothing of the D. C. ripple and keeps the peak voltage from reacting upon the tubes 250 and 250a.

Cathodes 251 and 251a are heated by the current flowing from transformer secondary 256. Cathode 61 and 61a are heated by the current flowing from transformer secondary 56, the center tap of which is connected with cathode shields 61S and 61Sa.

When the handle 100 of the control monitor is moved clockwise to cause the speed of the motor M to decrease, the spring 105C resists the tendency of extension 105a to move toward the left due to the frictional engagement of drum 102 (rotating clockwise) with bands 105 and 106 until the handle 100 has arrived at such position that a stop lug 102b (provided by plate 102a adjustably secured to drum 102 by a screw 102c passing through an arcuate slot 102d in plate 102a and threaded into a tapped hole in the drum 102) engages band 106. Thus further movement of handle 100 in a clockwise direction causes the contact 112 to engage contact 111 against the force exerted by spring 105c. Then magnet coil 113 of relay 125 is connected with secondary 32 and contact 116 is raised above contacts 117 and 118 and contact 121 is raised into engagement with contacts 122 and 123. Then the rectifier tubes 60—60a and 250—250a are disconnected and the impression of rectified current upon the motor windings ceases; and the armature A is shorted through an adjustable resistance 124, thereby causing motor M to stop quickly.

The construction of the control monitor will now be described in detail with reference to Figs. 3 to 7. The shaft which supports the handle 100 is rotatably supported by plates 130 and 131 attached to a base plate 132. Plate 132 supports a bracket 133 which supports pairs of angle bars 134. Each pair of angle bars 134 supports an external magnetizable core 135 of the reactors 72 and 74. Within each external core 135 is located a reactor coil 72 or 74 surrounding a non-magnetizable tube 136. Each tube receives an adjustable core 72a or 74a. As shown in Fig. 2 the cores 72a and 74a are connected by a cross pin 137 which is connected by links 138 and a pin 139 with a lever 140 pivoted upon a rod 141 supported by the plates 130 and 131. The right end of lever 140 pivotally supports a roller 142 for engaging a cam 143 attached to shaft 101. The roller 142 is urged toward the cam 143 and the cores 72a or 74a are urged downwardly by a spring 144 attached at its lower end to a screw 145 fixed to the base 132 and attached at its upper end to a screw 146 fixed to the lever 140. The cam 143 is so shaped as to increase the sensitivity of the control monitor as the handle 100 is moved counterclockwise from zero speed position.

The apparatus is housed by a case or cover 150 attached to the base. This case is provided with a slot 151 through which the handle 100a extends. A portion of the case adjacent the slot 151 may be provided with a scale of graduation showing the different speeds of the generator being tested corresponding to positions of the handle. The movement of the handle 100 is limited by providing the shaft 101 with a cross pin 155 (Fig. 4) the ends of which may strike a stop pin 156 attached to the plate 131.

The handle 100 is frictionally held in any position in which it may be set. For this purpose the shaft 101 drives a brake disc 160 engaged by brake shoes 161 and 162 attached to brake bands 163 and 164 which are hingedly connected at 165 and which are urged towards each other by a spring 166 surrounding a screw 167 passing through ends of the bands 163 and 164 and threadedly engaging a nut 168. The band 163 has a straight extension 163a attached by a screw 163b to base 132. The brake drum 160 is integral with the brake drum 102, also shown diagrammatically in Fig. 1.

As shown in Fig. 3, the plate 131 supports a bracket 170 carrying a nonconducting bushing 171 supporting a screw 172 carrying the contact 111. The screw receives a nut 173 for attaching the screw 172 to the bushing 171. The screw also receives a nut 174 for securing a wire (not shown) to the screw 172. The brake band extension 105a supports a non-conducting bushing 180 through which extends a screw 181 carrying the contact 112. Screw 181 receives a nut 182 for securing the screw to the band 105. Screw 181 receives a nut 183 for attaching a wire (not shown) to the screw 181. Plate 131 provides the stop member 105b located in the path of movement of the brake band extension 105, thereby limiting the extent of separation of the contacts 112 and 111 when the handle 100 is moved counterclockwise in Figs. 1 and 3.

The manner of hingedly connecting the parts of each pair of brake bands will now be described with reference to Fig. 7, which is drawn double the scale of Figs. 5 and 6. One of the brake bands such as 105, is provided with a slot 190 and the other brake band member, such as 106, is provided with a head 191 separated by a narrow neck 192 from the remainder of the band. Slot 190 is slightly longer than the width of the head 191 so that the head may be passed through the slot when the head is 90° from the position shown in Fig. 7. The neck 192, which is slightly greater in width than the thickness of the band member 106, is received by the intermediate enlarged portion 193 of the slot 190 when the member 106 is turned into the position shown in Fig. 7, after its head 191 has been passed through the slot 190. The band members 163 and 164 are hingedly connected in a similar fashion. The cover or case 150 supports the indicator lamp 152 as shown in Fig. 3, and may also support the switch 29.

Fig. 6 shows clearly the adjustable plate 102a having the lug 102b for engaging the band extension 105a as the handle 100 approaches zero position. To adjust the location of lug 102b, the screw 102c is loosened and the plate 102a is rotated about the axis of shaft 101, the bifurcations 102e of the plate bearing on the hub of the drum 102. The plate 102a is retained in adjusted position by tightening the screw 102c which passes through the arcuate slot 102d and is threaded into the drum 102.

When the system is used to control the speed of a 1 H. P. 220 v. D. C. motor having a normal speed of 3600 R. P. M., satisfactory results are obtained when the electrical dimensions of the various units are as follows:

Secondary 32—ends at 325 volts
Secondary 32—taps 27—28 at 57.5 volts
Secondary 56—ends at 3.25 volts
Secondary 57—ends at 25.00 volts
Secondary 256—ends at 2.75 volts
Tubes 60, 60a—type FG27A thyratron
Tubes 250, 250a—type 83
Resistors 253, 253a—200 ohms, 2 watts
Resistors 64, 64a—25,000 ohms, 1 watt
Resistors 71, 73—5000 ohms, 70 ma.
Reactors 72, 74—type #22D3G15
Swinging choke 84
Resistor 91—1500 ohms, 350 ma.
Condenser 90—4 mfd., 400 v.
Resistor 257b—1000 ohms, 315 ma.
Resistor 259—5000 ohms, 100 ma.
Condenser 260—1 mfd., — ma.
Resistor 124—10 ohms, 4000 ma.

The secondaries are provided with taps for voltage changes and the values of voltage given above are maximums.

While the embodiment of the present invention as herein disclosed, constitutes a preferred form, it is to be understood that other forms might be adopted, all coming within the scope of the claims which follow.

What is claimed is as follows:

1. Apparatus for controlling the speed of a D. C. motor having an armature and field, an A. C. source, means connected with the A. C. source for supplying a rectified current to the motor field, means connected with the A. C. source for supplying a rectified current to the motor armature, apparatus for varying the voltage of the rectified current supplied to the armature and including a variable inductive reactor having a movable core, and a controller having a movable operating handle and means operated thereby for moving the core and having means responsive to movement of the handle to low voltage position for causing the means which supplies rectified current to the motor armature to be rendered inoperative and for causing the motor armature to be resistance loaded.

2. Apparatus for controlling the speed of a D. C. motor having an armature and field, an A. C. source, means connected with the A. C. source for supplying a rectified current to the motor field, means connected with the A. C. source for supplying a rectified current to the motor armature, apparatus for varying the voltage of the rectified current supplied to the armature and including a variable inductive reactor having a movable core, a relay having a magnet coil and armature and two switches controlled by the armature, one being normally closed and the other normally open when the magnet coil is deenergized, and a controller having a movable operating handle and means operated thereby for moving the core and having a normally open switch controlling the circuit of said relay magnet coil and means responsive to movement of the handle to low voltage position for closing said switch of the controller whereby the normally closed switch and normally open switch of the relay are respectively open and closed, means responsive to the opening of the normally closed relay switch for rendering inoperative the means which supplies rectified current to the motor armature, and an armature resistance load established by the closing of the normally open relay switch.

RAOUEL B. HULL.